United States Patent [19]

Vick

[11] Patent Number: 5,031,602
[45] Date of Patent: Jul. 16, 1991

[54] CONVERTIBLE PORTABLE COOKING APPARATUS

[76] Inventor: Edward H. Vick, 1439 Markel Dr., Winter Garden, Fla. 34787

[21] Appl. No.: 564,728

[22] Filed: Aug. 8, 1990

[51] Int. Cl.⁵ .................. A47J 37/00; F24B 3/00
[52] U.S. Cl. ..................... 126/25 R; 126/1 AA; 126/21 R; 126/276; 126/289; 99/339
[58] Field of Search ............. 126/1 R, 25 R, 41 R, 126/40, 33, 9 R, 9 B, 289, 21 R, 290, 285 R, 293, 276, 4, 3, 25 A, 1 AA-1 E; 99/340, 447, 449, 450

[56] References Cited

U.S. PATENT DOCUMENTS

| 48,773 | 7/1865 | Clarke | 126/160 |
|---|---|---|---|
| D. 255,863 | 7/1980 | Futch | D7/108 |
| 324,055 | 8/1885 | Webb | 126/1 R |
| 538,469 | 8/1895 | Smith | 126/21 R |
| 697,538 | 4/1902 | Prowse | 126/160 |
| 774,397 | 11/1904 | Piper | 126/161 |
| 1,106,555 | 8/1914 | Goldberg | 126/21 R |
| 1,337,043 | 4/1920 | Child | 126/41 E |
| 1,475,651 | 11/1923 | Piper | 126/161 |
| 1,657,683 | 1/1928 | Martineau | 126/167 |
| 2,691,368 | 10/1954 | Hood | 126/25 |
| 2,727,505 | 12/1955 | Hood | 126/25 |
| 2,746,378 | 5/1956 | Lang | 99/447 |
| 2,983,269 | 5/1961 | Montesano | 126/25 |
| 3,326,201 | 6/1967 | Murray | 126/25 |
| 3,868,943 | 3/1975 | Hottenroth et al. | 126/25 R |
| 3,933,145 | 1/1976 | Reich | 126/25 R |
| 3,982,522 | 9/1976 | Hottenroth et al. | 126/2 |
| 4,209,006 | 6/1980 | Marsalko | 126/25 R |
| 4,279,240 | 7/1981 | Artusy | 126/419 |
| 4,607,608 | 8/1986 | Allred et al. | 126/30 |
| 4,630,593 | 12/1986 | Gremillion | 126/25 R |
| 4,677,964 | 7/1987 | Lohmeyer et al. | 126/41 R |
| 4,727,853 | 3/1988 | Stephen et al. | 126/41 R |
| 4,750,469 | 6/1988 | Biggs | 126/25 R |

FOREIGN PATENT DOCUMENTS 80832 2/1951 Czechoslovakia ............... 126/21 R

*Primary Examiner*—James C. Yeung
*Attorney, Agent, or Firm*—James H. Beusse

[57] ABSTRACT

A method and apparatus for cooking includes an apparatus convertible from a grill to a bake oven. The apparatus has a fire box positioned below a grill and incorporates a closed chamber supported on the fire box and enclosing the grill. A pivotable plate is mounted immediately below the grill and is pivotable between a vertical position and a horizontal position. In the horizontal position, the plate is latchable below the grill so as to separate the grill from the fire box. In this horizontal position, the closed grill chamber functions as an oven. When the pivotable plate is dropped into the vertical position, the grill is in direct communication with the fire box and can be used in a normal grill fashion.

22 Claims, 1 Drawing Sheet

U.S. Patent  July 16, 1991  5,031,602
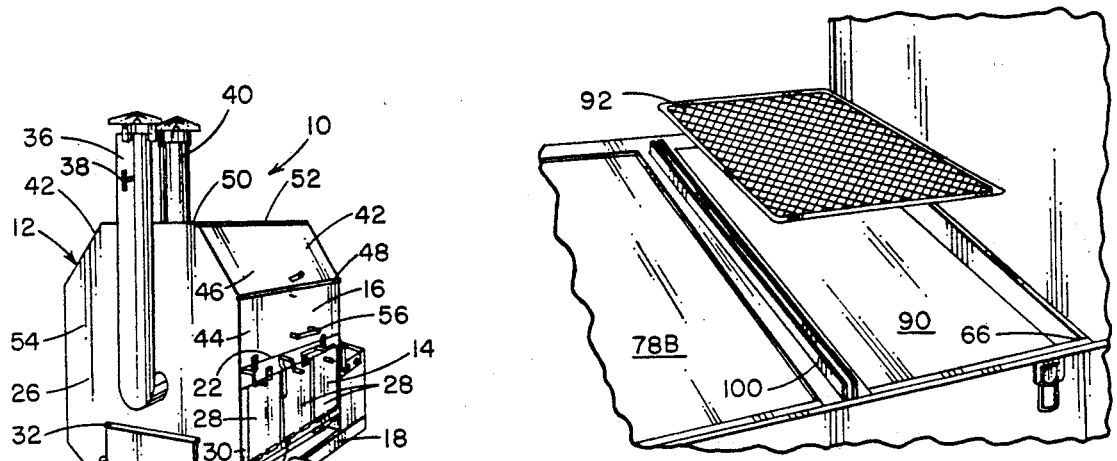
FIG. 1
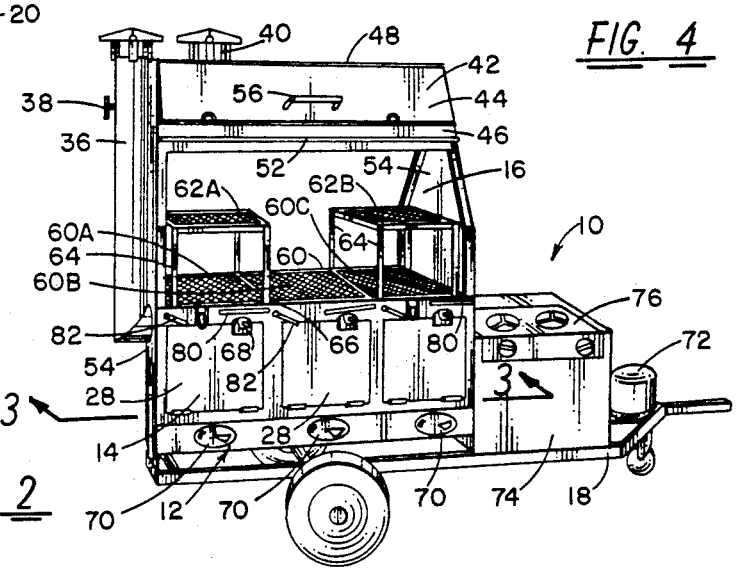
FIG. 4
FIG. 2
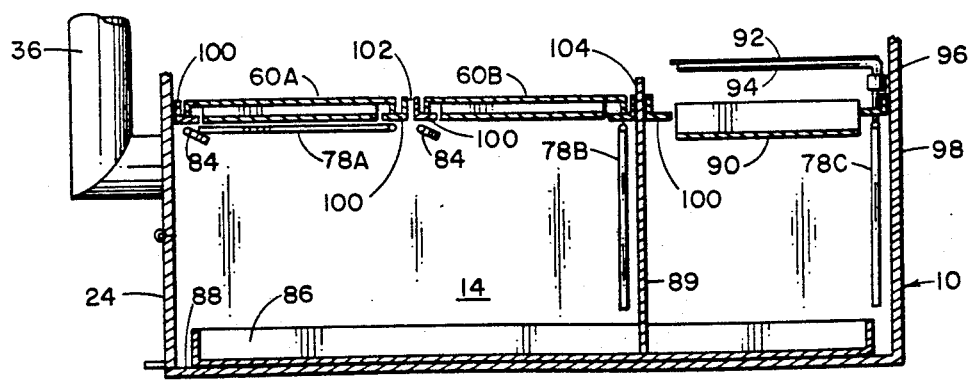
FIG. 3

CONVERTIBLE PORTABLE COOKING APPARATUS

The present invention relates to portable cooking devices and, more particularly, to portable grills.

BACKGROUND OF THE INVENTION

Outdoor cooking, often referred to as barbecue cooking, is generally accomplished using portable gas grills or portable grills fired from burning charcoal. Many of these grills have a fire box designed to accept charcoal or, in the case of gas grills, designed to accept a gas burner with an overlaying grid on which ceramic or lava briquettes are placed for spreading heat. A grill comprising an open grid structure seats adjacent the top of the fire box for supporting food products above the heat source (gas burner or charcoal) in the fire box. Some apparatus include means for raising and lowering either the grill or the heat source to thereby provide some control of heat applied to the food providers. Gas grills generally have gas regulators for controlling heat. In addition, many grills include covers which define a cooking chamber enclosing the grill and are particularly useful in "smoking" the food products to create a smoked flavor.

When the above described apparatus is used in outdoor cooking, a large amount of heat is generated and accompanied by significant volumes of smoke. The person using the apparatus is subjected to this heat and smoke whenever it is necessary to tend the apparatus, often resulting in singed eyebrows, watering eyes, and burned fingers. Thus, it is desirable to provide a method and apparatus for outdoor cooking which minimizes the heat and smoke problem.

The aforementioned apparatus is generally limited to cooking as either a grill, i.e., over direct heat, or as a smoker, i.e., with a closed cover. Often, however, it is desirable to cook some foods which are more properly baked, such as breads. Thus, it is desirable to provide a method and apparatus for using such portable grills in a baking mode.

Another disadvantage of the aforementioned cooking apparatus is that the spacing between the cooking surface, i.e., the grill, and the combustible material in the fire box is generally such that flare-ups caused by grease drippings extend around and above the food being cooked. While such flare-ups are commonly undesirable because of charring or blackening of the food, it has more recently been shown that various carcinogens may be concentrated in such grease drippings and transferred to the food by such flare-ups. Thus, it is desirable to provide a method and apparatus which minimizes flare-ups which can reach the food being cooked.

SUMMARY OF THE INVENTION

The above and other objects, features, and advantages of the present invention are obtained in a cooking apparatus which is convertible between a grill, a bake oven, and a smoker and comprises a fire box, a grill supported above the fire box, and a closed cooking chamber supported on the fire box and enclosing the grill. Both the fire box and cooking chamber are provided with flues. The flue from the fire box includes a damper control allowing the flue to be closed during cooking within the cooking chamber. A pivotable plate is mounted adjacent the top of the fire box immediately below the grill surface and is pivotable between an open and a closed position. In the closed position, a plate is oriented underneath and substantially parallel to a corresponding grill and isolates the grill from direct heat and smoke from the fire box. In the open position, the grill is directly exposed to combustible material within the fire box. In one form, the cooking apparatus may include a gas source and a gas burner attached at one end of the apparatus adapted for cooking of material within pots or pans. The cooking apparatus may be utilized with a charcoal receiving tray positioned in the bottom of the fire box for cooking over charcoal or other suitable combustible material or, in another form, may include a gas burner positioned in the bottom of the fire box for cooking with gas. In the gas burner configuration, a grid may be positioned above the gas burner to support the ceramic or lava type briquettes in a manner well known in the art.

In the illustrative embodiment, the cooking apparatus is used by passing a combustible material through an access door of the fire box or through the grilling surface and igniting the combustible material to create a bed of hot coals in the fire box below at least one grill. Food is then placed on the grill and the cooking chamber is closed to concentrate the heat received in the chamber from the hot coals in the fire box. In order to access the food within the cooking chamber, the flue connected to the fire box is opened to allow the heat and smoke from the coals to pass through the vent. The plates positioned in the fire box below the grills are then closed to isolate the grill surface from the heat generated in the fire box. A pair of opposed doors positioned on opposite sides of the cooking chamber are thereafter opened to exhaust the heat and smoke from the cooking chamber. The user is then able to access food on the grill without being exposed to the heat and smoke generated in the fire box. Once the food on the grill has been tended, the user may close the cooking chamber doors, lower the plates into their open position thereby exposing the food to the heat from the fire box, and thereafter close the vent from the fire box to force all of the heat and smoke from the coals to pass over the food in the cooking chamber.

BRIEF DESCRIPTION OF THE DRAWINGS

For a better understanding of the present invention, reference may be had to the following detailed description taken in conjunction with the accompanying drawings in which:

FIG. 1 is a perspective view of a cooking apparatus in accordance with the present invention;

FIG. 2 is an elevation view of the cooking apparatus of FIG. 1;

FIG. 3 is a cross-sectional view of the fire box of the cooking apparatus of FIG. 1; and FIG. 4 is an enlarged view of one section of the cooking apparatus of FIG. 2 illustrating an alternative grilling arrangement.

DETAILED DESCRIPTION OF THE PREFERRED EMBODIMENT

FIG. 1 is a perspective view of one form of cooking apparatus 10 constructed in accordance with the teachings of the present invention. The apparatus 10 comprises an essentially octagon shaped housing 12 defining a fire box 14 and a cooking chamber 16. The housing 12 may be mounted on a trailer frame 18 with wheels 20 to allow transport of the apparatus. The fire box 14 is defined as that portion of the apparatus below the line 22 while the cooking chamber 16 is defined above the line 22.

Access to the fire box 14 is provided by a door 24 in an end wall 26 and by doors 28 in a front wall 30. The door 24 is preferably hinged at 32 and opens by pivoting outwardly and upwardly about hinge 32. Such arrangement of door 24 is desirable to allow a charcoal tray to be slid into the fire box 14. The doors 28 are hinged at 34 along their lower edges and swing outwardly and downwardly. Such arrangement of doors 28 allows additional combustible material, such as hickory chips or nuts, to be added to the fire.

It will be apparent from the above description that the cooking apparatus 10 is preferably designed for charcoal cooking and will be described with that embodiment. However, it will be apparent that the apparatus can be converted to a gas cooker by simple installation of a gas burner in the bottom of the fire box 14. Furthermore, a grid could be installed above such a gas burner for supporting briquettes of ceramic or lava as is used in conventional gas grills. Additionally, reference to charcoal will be understood to include other combustible wood products.

The fire box 14 also includes a flue 36 having a damper control indicated at 38. The cooking chamber 16 is also provided with a flue 40.

Access to the cooking chamber 16 is provided by an opposing pair of piano type doors 42. Each of the doors 42 have a lower section 44 and an upper section 46 joined by a piano hinge 48. The upper section 46 is joined to a top 50 of the chamber 16 by a piano hinge 52. Each door 42 is constructed to seat securely against opposite end walls 54 of the cooking chamber and against an upper edge of fire box 14 so as to provide a substantially closed cooking chamber 16. Each door 42 includes a handle 56, preferably having a low thermal conductivity cover such as wood, over a metal member fixedly attached to the door 42 near a lower edge of section 44. Each of the doors 42 is opened by lifting vertically with the handle 56 and pushing the lower section 44 towards the apparatus 10 so that folding of the sections 44, 46 occurs along the hinge 48. The folded pair of sections 44, 46 also pivot upward about hinge 52 and can be laid back against the flue 40 and will remain in that position while a user is accessing the cooking chamber 16.

Turning now to FIG. 2, there is shown an elevation view of the cooking apparatus 10 of FIG. 1 with the doors 42 in their open position as described above. Positioned on top of the fire box 14 and preferably suspended from front and rear sides of the fire box is a plurality of grills 60A, 60B, and 60C. While the apparatus is illustrated in a form having a relatively large cooking surface divided into three sections as indicated by grills 60A, 60B, and 60C, it will be appreciated that more or fewer sections could be constructed without departing from the scope of the invention. Since the cooking chamber 16 is generally arranged for cooking as a closed chamber, additional grills 62A, 62B supported above the grills 60 may also be used in the apparatus. In the illustration, the grills 62A, 62B are each supported on legs 64 seated on corners of the grills 60. Because of the relatively large size of the exemplary apparatus (each grill 60 is sixteen inches wide and thirty-six inches long), the grill 60 is preferably formed with angle iron side edges 66 to inhibit deformation.

Each of the access doors 28 is fitted with a latch 68 to maintain them in their closed position. Air for the fire box 14 is admitted through a plurality of dampers 70, at least one located in the fire box panel below each respective one of the doors 28. The damper 70 is a common damper of a type well known in the art which can be selectively positioned to regulate air flow and thereby control the heat output from the fire box 14. Plural dampers are desirable to facilitate use of one or two sections of the grill as will be discussed hereinafter.

The apparatus 10 may also include an LP gas tank 72 supported on frame 18 at one end of the apparatus. An enclosure 74 adjacent tank 72 supports a gas burner 76 which provides additional cooking capability separate from the housing 12. One or more burners may be constructed in enclosure 74.

One of the features of the present invention is the ability to effectively isolate the fire box 14 from the cooking chamber 16. Such a feature is desirable when cooking to allow inspection or turning of food on grills 60 without being overcome by heat and smoke from the fire box 14. In the illustrative embodiment, this feature is implemented by metal plates 78 (shown in FIG. 3) which can be positioned beneath and substantially parallel to respective ones of the grills 60. The handles 80 are each connected to a corresponding one of the plates 78A, 78B, 78C and enable the plates to be rotated into their closed position from the outside front of the fire box 14. When in the closed position, a respective handle 82 operates a spring loaded latch 84 (see FIG. 3) to hold the plates 78 in the closed position.

FIG. 3 is a cross-sectional view taken along the lines 3—3 in FIG. 2 but with one section of the fire box 14 modified to illustrate another feature of the invention. This view shows a plate 78A in a closed position and a plate 78B in an open position. It can also be seen that a tray 86 rests on the bottom 88 of the fire box 14. Tray 86 is provided to contain charcoal or other combustible material and provides both a efficient method of loading charcoal into the fire box 14 and cleaning ashes and other residue from the fire box simply by sliding the tray 86 out of the fire box through access door 24.

Another feature in FIG. 3 is the use of a divider 89 for separating the apparatus 10 into isolated sections. Such separation is useful in the event that a reduced amount of grill surface is required for cooking and it is desired to conserve combustibles, such as charcoal. In FIG. 3, however, the divider 89 is used to separate one section of the apparatus such that a secondary charcoal tray 90 can be positioned near the top of the fire box 14. The tray 90 is used in conjunction with an additional grill 92 mounted in a swing-out arm 94. The arm 94 is supported by a bracket 96 attached to an end 98 of the apparatus 10. The tray 90 positions a heat source close to the grill 92 and is desirable for searing steaks and other selected cuts of meat. The grill 92 can be swung out of the cooking chamber 16 when an appropriate one of the doors 42 is open. This swing-out ability facilitates placing and lighting of charcoal in tray 90 and also allows adding, removing, and checking of meat on grill 92 without danger of injury from fire.

As is shown, the grills 60 are supported within fire box 14 by angle iron strips 100 attached to walls of the fire box. At the intermediate locations 102 and 104, the strips 100 are spaced slightly apart to allow insertion of the divider 89.

One of the significant features of the apparatus 10 is the spacing between the grills 60 and the tray 86. Various studies have shown that a spacing of about seventeen inches between a heat source and food being cooked is desirable in order to minimize the introduction of carcinogens into food being cooked over an open fire. It is believed that such a distance allows carcinogens to be incinerated, in the event of flare-ups caused by grease drippings, before such carcinogens can be introduced into meat being cooked. In this respect, the grills 60 are each about sixteen inches in width and the plates 78 are approximately sixteen inches. As can be seen, the plates 78 when in the open or vertically oriented position do not completely reach the upper edge of the charcoal tray 86. Thus, at least seventeen inches is provided between grills 60 and the heat source. While this distance is desirable for grilling, in a preferred embodiment, the grills 60 are positioned about twenty-four inches above the tray 86 thus providing additional spacing between the cooking surface on the grills 60 and the heat source in tray 86 for smoking at lower heat concentration. The tray 86 may be supported on racks (not shown) attached to the sides of the grill in order to allow positioning at alternative spacing from the cooking surface.

FIG. 4 is a partial perspective view of the apparatus 10 better illustrating the grill 92 and raised tray 90 as viewed from the rear side of the fire box 14. This view also shows an adjacent section with a plate 78B in a closed position. A pair of the angle iron strips 100 for supporting the grills 60 also appear in this view.

In using the present invention, the tray 86 is slid at least partially out the end access door 24 to allow a selected amount of charcoal or other combustible material to be loaded onto the tray 86. If charcoal is used and all sections of the exemplary three-section grill are to be utilized, about twenty pounds of charcoal has been found sufficient to maintain the cooking chamber 16 at a reasonable cooking temperature, e.g., about 230° F., for at least two hours. The charcoal is lighted in a conventional manner and allowed to burn until a satisfactory bed of coals is established, generally indicated by substantially white coloration of the charcoal. The coals may be spread relatively uniformly over the tray 86 using a garden tool such as a hoe or rake.

In order to place meat or other food on the grills 60 once the charcoal has reached the above mentioned condition, the damper control 38 is moved to an open position so that an air flow path is established from damper 70 over the coals in tray 86 and out through flue 36. This air flow path maintains combustion of the coals and diverts smoke and heat from the grills 60. The plates 78 are then raised into their closed position underneath and substantially parallel to the grills 60 thus isolating the cooking chamber 16 from the heat in fire box 14. Each of the doors 42 is then raised in sequence to allow accumulated heat and smoke in the cooking chamber 16 to dissipate. Thereafter, food may be placed on the grills 60 in relative comfort or, if food is already on the grills 60, may be tended without the user being subjected to heat and smoke from the fire.

Reverting to the cooking status is essentially a reverse process from that of opening the cooking chamber. The doors 42 are first closed and then the plates 78 are dropped to expose the grills 60 to the fire box 14. The damper control 38 is moved to a closed position to force heat and smoke into the cooking chamber 16. Note that the flue 40 remains open at all times even though it is not needed when the doors 42 are open.

It is believed that the octagon configuration of the housing 12 contributes significantly to the heat distribution within the cooking chamber. In particular, it is believed that the repeated angularly oriented surfaces reflect heat toward the cooking surfaces, i.e., on the grills 60 and 62. It has been found that meat placed on grills 60 and 62 can be browned without turning, i.e., when only one side is directly facing the fire, using the apparatus, although one side may be somewhat more brown than the other. For this embodiment, the housing was also constructed such that the distance from the grill surface 60 to the top of the cooking chamber 16 is the same as the distance to the bottom of the fire box 14.

While the principles of the present invention have now been made clear in an illustrative embodiment, it will become apparent to those skilled in the art that many modifications of the structures, arrangements, and components presented in the above illustrations may be made in the practice of the invention in order to develop alternative embodiments suitable to specific operating requirements without departing from the spirit and scope of the invention as set forth in the claims which follow.

What Is claimed is:

1. A cooking apparatus convertible from a grill to a bake oven comprising:
   a fire box having front and rear walls, a pair of opposing end walls and a bottom;
   a grill supported above said fire box;
   a closed chamber supported on said fire box and enclosing said grill, said chamber being operable to provide access to said grill; and
   a pivotable plate mounted between said front and rear walls and pivotable between a first position substantially parallel to one of said end walls and a second position substantially parallel to and underlaying said grill, said apparatus being operable as a grill when said plate is in said second position.

2. The apparatus of claim 1 and including first vent means attached to said closed chamber for venting smoke therefrom and further including second vent means attached to said fire box for venting smoke therefrom when said plate is in said second position.

3. The apparatus of claim 2 and including damper means in said second vent means for closing said second vent means when said plate is in said first position.

4. The apparatus of claim 1 wherein said closed chamber comprises a pair of opposed doors, each of said pair of doors being substantially coextensive with a respective one of said front and rear walls of said fire box for fully exposing said grill when either one of said doors is in a fully open position.

5. The apparatus of claim 4 wherein each of said doors is vertically raisable to provide access to said grill, each of said doors comprising at least two foldable, hinged sections collapsible adjacent a top of said closed chamber and supported thereon when in said fully open position.

6. The apparatus of claim 1 and including an access door in one of said opposing end walls for inserting flammable wood products into said fire box.

7. The apparatus of claim 1 and including damper means formed in one of said walls of said fire box for controlling air flow thereinto.

8. The apparatus of claim 1 wherein said grill is approximately twenty-four inches above said bottom of said fire box.

9. The apparatus of claim 8 and including a slidable tray positionable on said bottom of said fire box for holding charcoal, said grill being at least approximately seventeen inches above charcoal placed in said tray.

10. The apparatus of claim 1 and including a plurality of grills supported above said fire box and a corresponding plurality of pivotable plates mounted adjacent respective ones of said grills, and further including a plurality of impervious dividers selectively insertable into said fire box between adjacent ones of said grills, said dividers separating said fire box into sections coextensive with selected ones of said grills.

11. The apparatus of claim 10 and including means extending from one of said pair of opposing end walls for supporting a gas burner and an LP gas tank.

12. The apparatus of claim 10 and including a wheeled trailer frame supporting said fire box for transporting said apparatus.

13. The apparatus of claim 1 and including a removable fire tray attachable to selected ones of said walls adjacent said grill and grill means pivotably attachable to said fire box and overlaying said fire tray in at least one position thereof, the space between said fire tray and said grill means being less than the spacing between said grill and said fire box bottom for applying high intensity heat to food products placed on said grill means.

14. A method of grilling food in a cooking apparatus, the cooking apparatus including a fire box, at least one grill supported above the fire box, an enclosable chamber associated with the fire box and encompassing the grill, at least one plate pivotable between a substantially vertical orientation exposing the grill to the fire box and a substantially horizontal orientation isolating the grill from the fire box, a selectively operable vent means for communication with the fire box, and access means associated with the fire box for receiving a combustible material therein, the method comprising the steps of:
  passing the combustible material through the access means into the fire box and igniting the combustible material to create a bed of hot coals in the fire box below the at least one grill;
  placing the food on the at least one grill;
  enclosing the chamber to concentrate the heat received in the chamber from the hot coals in the fire box;
  closing the vent connected to the fire box to force the heat from the hot coals past the at least one grill into the enclosed chamber and cooking the food for a preselected time period;
  opening the vent after the passage of the preselected time period thereby to allow the heat from the fire box to vent to atmosphere and pivoting the at least one plate to its substantially horizontal position to isolate the enclosed chamber from the fire box;
  releasably retaining the at least one plate in its substantially horizontal position; and
  opening the enclosed chamber to provide access to the food on the at least one grill when the at least one plate is in its substantially horizontal position.

15. The method as set forth in claim 14 wherein the cooking apparatus further includes damper means for controlling air flow into the fire box and wherein the method further comprises the intermediate step of adjusting the damper means to control heat communicated to the enclosed chamber.

16. A method of operating a cooking apparatus, the cooking apparatus including an internal common chamber predeterminately divided into a heat generating chamber and a cooking chamber, the apparatus including at least one plate movable between a set of preselected positions, the method comprising the step of:
  coupling heat flow directly from the heat generating chamber into the cooking chamber;
  selectively isolating the cooking chamber from the heat generating chamber and interrupting the heat flow from the heat generating chamber into the cooking chamber in response to the selectively isolating step, the selectively isolating step including selectively disposing the at least one plate in one of its preselected positions thereby to at least in part separate the heat generating chamber from the cooking chamber; and
  venting the heat generating chamber at least upon the occurrence of the selectively isolating step.

17. The method as set forth in claim 16 further comprising the additional step of opening the cooking chamber to gain entry thereinto when the cooking chamber is selectively isolated from the heat generating chamber.

18. The method as set forth in claim 17 further comprising the further additional step of selectively closing the cooking chamber and reestablishing the heat flow from the heat generating chamber to the cooking chamber at least upon the occurrence of the closing step.

19. The method as set forth in claim 18 further comprising the further additional step of interrupting the venting of the heat generating chamber at least upon the occurrence of the reestablishing step.

20. The method as set forth in claim 16 further comprising the preliminary step of venting the cooking chamber.

21. The method as set forth in claim 20 further comprising the additional step of selectively actuating said at least one plate from its one preselected position into another of its preselected positions thereby to establish the heat flow from the heat generating chamber to the cooking chamber.

22. The method as set forth in claim 20 further comprising the additional step of releasably retaining the at least one plate in its one preselected position against displacement therefrom.

* * * * *